US009193021B2

United States Patent
Machida et al.

(10) Patent No.: US 9,193,021 B2
(45) Date of Patent: Nov. 24, 2015

(54) POWER TOOL DUST COLLECTING DEVICE AND POWER TOOL

(75) Inventors: Yoshitaka Machida, Anjo (JP); Kiyonobu Yoshikane, Anjo (JP)

(73) Assignee: MAKITA CORPORATION, Anjo (JP)

( * ) Notice: Subject to any disclaimer, the term of this patent is extended or adjusted under 35 U.S.C. 154(b) by 540 days.

(21) Appl. No.: 13/567,399

(22) Filed: Aug. 6, 2012

(65) Prior Publication Data

US 2013/0055527 A1    Mar. 7, 2013

(30) Foreign Application Priority Data

Sep. 7, 2011    (JP) .................................. 2011-195282

(51) Int. Cl.
*B23Q 11/00*    (2006.01)
*A47L 9/28*     (2006.01)

(52) U.S. Cl.
CPC ........... *B23Q 11/0046* (2013.01); *A47L 9/2842* (2013.01); *B23Q 11/005* (2013.01); *B23Q 11/006* (2013.01)

(58) Field of Classification Search
CPC ....... A47L 9/2857; A47L 9/19; A47L 9/2842; A47L 9/02; A47L 9/2889; B23Q 11/0046; B23Q 11/005; B23Q 11/006
USPC ............ 15/326, 339, 413; 173/171, 198, 217; 408/58, 67
See application file for complete search history.

(56) References Cited

U.S. PATENT DOCUMENTS

| 4,512,713 A * | 4/1985 | Berfield ........................ 415/119 |
| 4,665,581 A * | 5/1987 | Oberdorfer ..................... 15/326 |
| 4,673,043 A | 6/1987 | Greppmair |
| 5,455,984 A * | 10/1995 | Blase .............................. 15/339 |
| 7,017,680 B2 * | 3/2006 | Arich et al. .................. 173/198 |
| 2009/0266571 A1 | 10/2009 | Baumann et al. |
| 2011/0011608 A1 | 1/2011 | Saur |

FOREIGN PATENT DOCUMENTS

| DE | 10 2005 047 353 A1 | 4/2007 |
| DE | 10 2005 059 180 A1 | 6/2007 |
| EP | 1 459 842 A1 | 9/2004 |
| JP | 2010-064199 A | 3/2010 |

(Continued)

OTHER PUBLICATIONS

Jan. 21, 2013 European Search Report issued in European Patent Application No. 12179505.8.

(Continued)

*Primary Examiner* — Robert Scruggs
(74) *Attorney, Agent, or Firm* — Oliff PLC

(57) ABSTRACT

A power tool dust collecting device includes, in a housing in which a suction opening is protrudingly provided and on which a power tool is mountable, a motor chamber holding a motor having a brush that comes into sliding contact with a commutator of a rotor rotating integrally with an output shaft, a fan chamber housing a dust collecting fan attached to the output shaft of the motor, and a dust collecting chamber in which a filter, through which passes air sucked up from the suction opening due to rotation of the dust collecting fan in accordance with driving of the motor and which collects dust in the air, is mounted on an upstream side of the fan chamber. A cushioning member is interposed between an inner wall of the motor chamber and an outer peripheral surface of the motor.

8 Claims, 3 Drawing Sheets

(56) References Cited

FOREIGN PATENT DOCUMENTS

| | | | |
|---|---|---|---|
| JP | 2011-125675 | A | 6/2011 |
| WO | 2010/147153 | A1 | 12/2010 |

OTHER PUBLICATIONS

Japanese Office Action issued in Application No. 2011-195282 dated Dec. 26, 2014.

* cited by examiner

POWER TOOL DUST COLLECTING DEVICE AND POWER TOOL

BACKGROUND OF THE INVENTION

This application claims the benefit of Japanese Patent Application Number 2011-195282 filed on Sep. 7, 2011, the entirety of which is incorporated by reference.

TECHNICAL FIELD

The present invention relates to a power tool dust collecting device that is mounted on a power tool, such as a power drill or a hammer drill etc., and to a power tool on which the power tool dust collecting device is mounted.

BACKGROUND ART

U.S. Pat. No. 7,017,680, for example, discloses a power tool dust collecting device on which a hammer drill is mounted and which is provided with a housing in which a suction opening is protrudingly provided. A motor chamber holding a motor, a fan chamber housing a dust collecting fan attached to an output shaft of the motor, and a dust collecting chamber in which a filter is mounted on an upstream side of the fan chamber are provided in the housing of the power tool dust collecting device. Dust sucked up from the suction opening due to rotation of the dust collecting fan is collected by the filter.

However, in the above-described power tool dust collecting device on which a power tool such as a hammer drill etc. is mounted, if the motor is held via ribs on an inner wall of the motor chamber, vibration generated during operation of the power tool is continuously transmitted to the motor via the ribs. Consequently, a rotor of the motor continuously whirls, which causes a commuter provided on the rotor to come into sliding contact with a brush. Therefore, the brush is worn easily, and the life of the motor is shortened.

SUMMARY OF INVENTION

The present invention has been devised in light of the above-described circumstances, and provides a power tool dust collecting device inhibiting the life of a motor from being shortened, and a power tool on which the power tool dust collecting device is mounted.

A first aspect of the invention provides a power tool dust collecting device including a housing, a motor chamber, a fan chamber, a dust collecting chamber and a cushioning member. The housing on which a power tool is mountable has a suction opening which is protrudingly provided. The motor chamber provided in the housing holds a motor having a brush that comes into sliding contact with a commutator of a rotor rotating integrally with an output shaft. The fan chamber provided in the housing houses a dust collecting fan attached to the output shaft of the motor. The dust collecting chamber is provided in the housing, and a filter is mounted to the dust collecting chamber wherein air sucked up from the suction opening passes through the filter on an upstream side of the fan chamber and dust is collected in the air due to rotation of the dust collecting fan in accordance with driving of the motor. The cushioning member is interposed between an inner wall of the motor chamber and an outer peripheral surface of the motor.

A second aspect of the invention according to the first aspect, is configured that a rubber pin to be used as the cushioning member is provided in a plurality, and the plurality of rubber pins are arranged in parallel with the output shaft at a predetermined interval along the outer peripheral surface.

A third aspect of the invention according to the first aspect, is configured that the housing is provided with a partition wall forming a partition between the motor chamber and the fan chamber and through which the output shaft passes, and a seal member inhibiting communication between the motor chamber and the fan chamber is provided on an opening which is formed in the partition wall and through which the output shaft passes.

A forth aspect of the invention provides a power tool on which is mounted the power tool dust collecting device according to the first aspect of the invention.

With the power tool dust collecting device according to the first aspect of the invention and the power tool according to the forth aspect of the invention, even when vibration generated during operation of the power tool is transmitted to the housing, the vibration can be prevented from being transmitted to the motor, owing to the cushioning member. Consequently, whirling of the rotor of the motor is suppressed. Accordingly, wear of a brush that comes into sliding contact with the commutator provided on the rotor can be suppressed. It is thus possible to inhibit the life of the motor from being shortened.

According to the second aspect of the invention, for example, in comparison to a conventional case in which the cushioning member is provided in a cylindrical shape covering the outer peripheral surface of the motor, rubber to be used for the cushioning member can be reduced. Thus, a cost of the cushioning member can be reduced.

According to the third aspect of the invention, even if dust enters the fan chamber, it can be prevented the dust from entering the motor chamber.

DETAILED DESCRIPTION OF THE EMBODIMENTS

Figure 1:
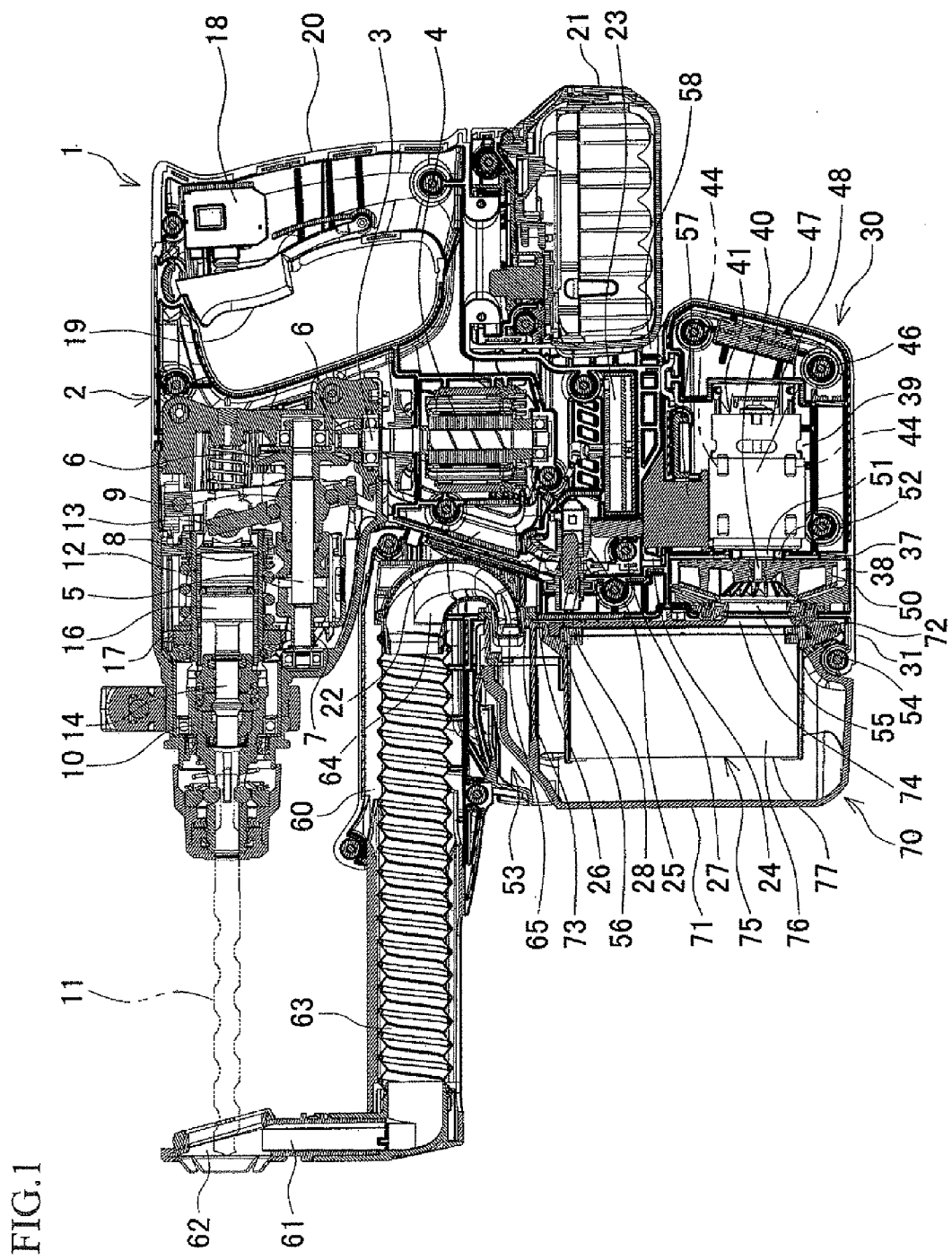
FIG. 1 is a side cross-sectional view of a hammer drill on which is mounted a power tool dust collecting device according to an embodiment of the present invention.

An embodiment of the present invention will be explained with reference to FIG. 1 to FIG. 3. FIG. 1 shows a power tool dust collecting device 30 (hereinafter referred to as a dust collecting device 30) mounted on a hammer drill 1. The hammer drill 1 is an example of a power tool of the present invention, and is provided with a main housing 2 made of resin. In FIG. 1, the left side is the front side of the main housing 2 and the right side is the rear side of the main housing 2. As shown in FIG. 1, a motor 4 having an upwardly facing output shaft 3 is housed in the lower portion on the front side inside the main housing 2. Above the output shaft 3 inside the main housing 2, a countershaft 5 is axially supported in a direction intersecting with the output shaft 3, and torque is transmitted from the output shaft 3 to the countershaft 5 via bevel gears 6. The countershaft 5 is provided with a first gear 7, a clutch 8 and a boss sleeve 9 in that order from the front side. Above the countershaft 5 inside the main housing 2, a tool holder 10 is axially supported in parallel with the countershaft 5 and a bit 11 can be inserted into the leading end of the tool holder 10. A piston cylinder 12 is loosely inserted on the rear side of the tool holder 10, and an atm 13 attached to the boss sleeve 9 is coupled to the rear end of the piston cylinder 12. An impact bolt 14 is housed inside the piston cylinder 12 on the front side, and a striker 16 striking the impact bolt 14 is housed to the rear side of the impact bolt 14. Both the impact bolt 14 and the striker 16 are housed such that they can move in the front-rear direction. The first gear 7 meshes with a second gear 17 mounted on the tool holder 10.

Further, as shown in FIG. 1, a handle 20 having a switch 18 and a switch lever 19 are provided on the upper portion on the rear side of the main housing 2. A battery pack 21 as a power source is mounted below the handle 20. In addition, the front surface of the lower portion on the front side of the main housing 2 inclines downward and to the front so as to protrude in front of the battery pack 21, and forms a mounting portion 22 on which the dust collecting device 30 is mounted. A controller 23 is housed in the interior of the mounting portion 22, and a coil of the motor 4, the switch 18 and the battery pack 21 are electrically connected to the controller 23. In addition, a guiding groove 24 is formed as a recess extending in the front-rear direction in the center of the underneath surface of the mounting portion 22 in the left-right direction, such that the front end of the guiding groove 24 opens to the front side.

A connector 25 is provided on the upper portion on the front side of the controller 23 in the mounting portion 22. The connector 25 has three female terminals, for a power source and for communication, arranged in a row at a predetermined interval in the left-right direction. The connector 25 has a rectangular cylinder shape that is open at the front side, and a shutter portion 26 is integrally provided with the upper surface front end of the connector 25 such that the shutter portion 26 is oriented upward. Further, in the center of the underneath surface of the mounting portion 22, below the connector 25, a pressing piece 27 is supported such that it can move in the up-down direction.

In addition, a square-shaped socket 28 is provided as an opening in the front surface of the mounting portion 22, on the front side of the connector 25. The connector 25 can be rotated to a connected position in which the shutter portion 26 withdraws to the upper side of the socket 28 and the opening is positioned directly behind the socket 28, and to a non-connected position in which the shutter portion 26 is positioned directly behind the socket 28 and the opening is caused to withdraw below the socket 28. It should be noted that, in a state in which the dust collecting device 30 is not mounted on the hammer drill 1, the connector 25 is rotationally urged, by a torsion spring that is not shown in the drawings, to the non-connected position in which the shutter portion 26 blocks the socket 28. In the non-connected position, the pressing piece 27 is pressed by the connector 25 withdrawn to the lower side so as to penetrate the mounting portion 22 and protrude into the guiding groove 24.

The dust collecting device 30 is provided with a housing 31 having an L shape in a side view, as shown in FIG. 1. As shown in FIG. 2 and FIG. 3, the housing 31 is provided by assembling left and right half housings 32 and 33 made of resin. In FIG. 2, the left side is the left side of the housing 31 and the right side is the right side of the housing 31. In FIG. 3, the right side is the front side of the housing 31 and the left side is the rear side of the housing 31. As shown in FIG. 2 and FIG. 3, an engagement recess portion 34, which engages with the mounting portion 22 (refer to FIG. 1) of the hammer drill 1, is formed in the upper portion on the rear side of the housing 31.

Figure 2:
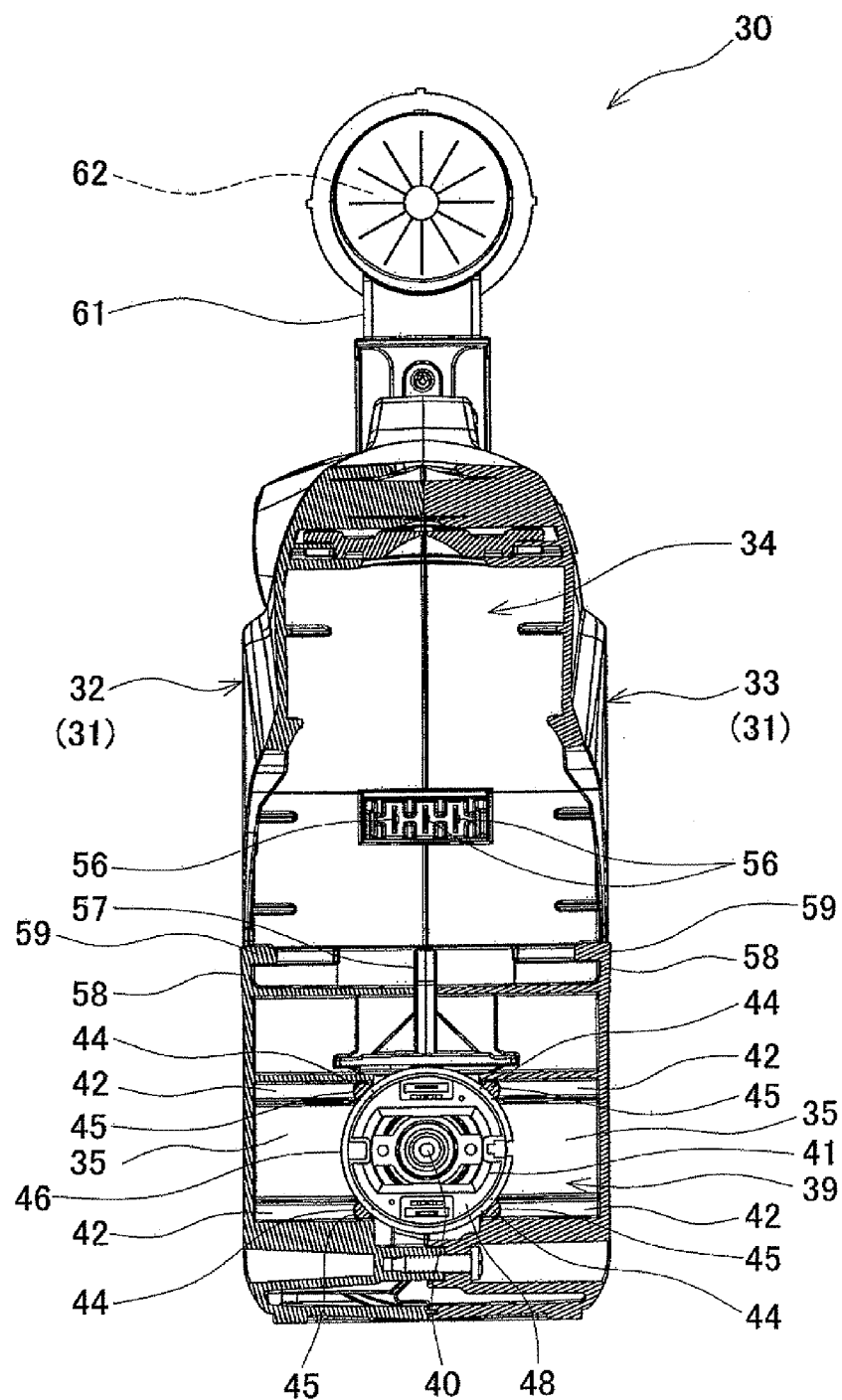
FIG. 2 is a vertical cross-sectional view of a main part of the power tool dust collecting device.
Figure 3:
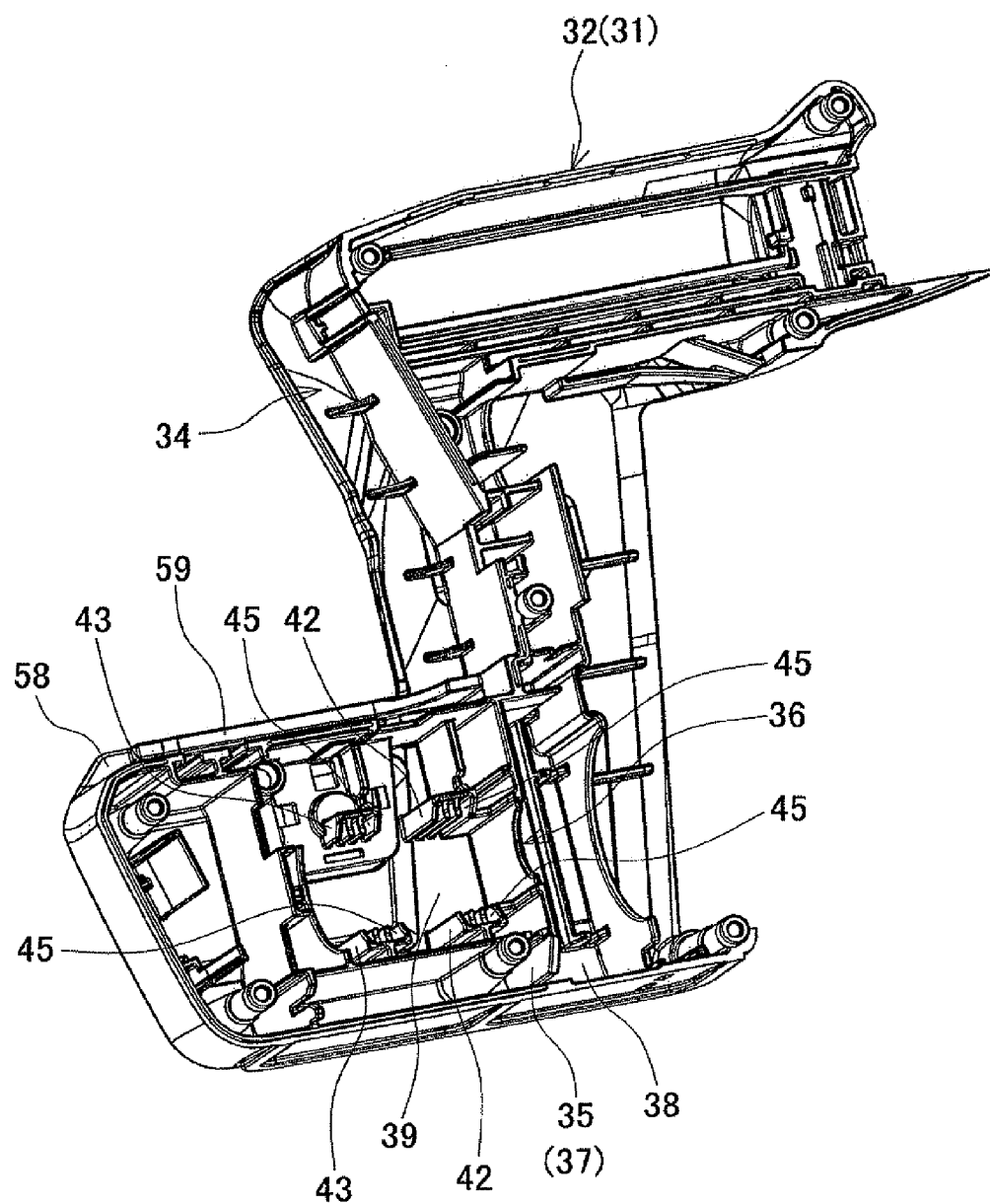
FIG. 3 is a perspective view of half housings that form a housing of the power tool dust collecting device.

As shown in FIG. 3, a rib 35 is protrudingly provided on an inner wall surface on the rear side of the left half housing 32. A semicircular cut out is provided in the vicinity of the center of the rib 35 in the up-down direction. Further, the rib 35 (refer to FIG. 2) provided with the aforementioned cut out is protrudingly provided also on an inner wall surface on the rear side of the right half housing 33. In the assembled state of the left and right half housings 32 and 33 shown in FIG. 1 and FIG. 2, the rib 35 of the left half housing 32 faces the rib 35 of the right half housing 33, and thus a first partition wall 37 (refer to FIG. 1 and FIG. 3) having in its center a through hole 36 (refer to FIG. 3) is provided on the rear side inside the housing 31. As shown in FIG. 1, on the rear side inside the housing 31, a fan chamber 38 and a motor chamber 39 adjacent in the front-rear direction of the housing 31 are partitioned by the first partition wall 37. It should be noted that the first partition wall 37 is an example of a partition wall of the present invention.

As shown in FIG. 1, a motor 41 is housed in the motor chamber 39 such that an output shaft 40 faces toward the front side and the motor 41 is oriented sideways. A controller 47 is housed in the motor chamber 39, on the rear side of the motor 41. As shown in FIG. 2 and FIG. 3, a plurality of columnar protruding portions 42 and 43 are disposed in two rows on an inner wall surface of the motor chamber 39 in the left half housing 32. The plurality of protruding portions 42 and 43 protrude into the motor chamber 39 from positions that are separated from each other in the up-down direction. The protruding portions 42 and the protruding portions 43 are positioned separate from each other in the front-rear direction of the left half housing 32. In the present embodiment, two of the protruding portions 42 are provided on the front side of the left half housing 32, and two of the protrusions 43 are provided on the rear side of the left half housing 32. Transverse grooves 45 are formed in the leading end portions of the respective protruding portions 42 and 43. Rubber pins 44 (refer to FIG. 1 and FIG. 2) serving as a cushioning member can be fitted into the transverse grooves 45 in a state in which the rubber pins 44 protrude.

In a similar manner to the left half housing 32, two of the protruding portions 42 (refer to FIG. 2) and two of the protruding portions 43 are also provided on an inner surface of the right half housing 33, and the transverse grooves 45 are formed in the respective protruding portions 42 and 43. When the left and right half housings 32 and 33 are assembled, the protruding portions 42 of the left half housing 32 face the protruding portions 42 of the right half housing 33, and the protruding portions 43 of the left half housing 32 face the protruding portions 43 of the right half housing 33. A motor cover 46 attached to an outer peripheral surface of the motor 41 is held while being sandwiched between the protruding portions 42 and 43 of the left half housing 32 and the protruding portions 42 and 43 of the right half housing 33. At this time, the eight rubber pins 44 fitted into the respective transverse grooves 45 of the protruding portions 42 and 43 are interposed between the respective protruding portions 42 and 43 and an outer peripheral surface of the motor cover 46 in a state in which the eight rubber pins are elastically deformed and attached firmly to the outer peripheral surface of the motor cover 46. In the present embodiment, the respective transverse grooves 45 of the protruding portions 42 and 43 are arranged in parallel with the output shaft 40 of the motor 41 in the above-described assembled state. Therefore, the eight rubber pins 44 are disposed in parallel with the output shaft 40. In addition, as shown in FIG. 3, the protruding portions 42 having the transverse grooves 45 are arranged in the positions that are separated from each other in the up-down direction, and the protruding portions 43 having the transverse grooves 45 are arranged in the positions that are separated from each other in the up-down direction. Thus, the eight rubber pins 44 are arranged at a predetermined interval along the outer peripheral surface of the motor cover 46.

Further, as shown in FIG. 1, the output shaft 40 enters into the fan chamber 38 from the through hole 36 of the first partition wall 37. A dust collecting fan 50 attached to the output shaft 40 is housed in the fan chamber 38. When the output shaft 40 is entered into the fan chamber 38, a cylindrical portion 51 through which the output shaft 40 passes is inserted into the through hole 36. The cylindrical portion 51 is provided so as to protrude from a leading end surface of a motor case 48. A ring-shaped seal member 52 made of rubber is fitted between an inner peripheral surface of the through hole 36 and an outer peripheral surface of the cylindrical portion 51. The seal member 52 inhibits the fan chamber 38 and the motor chamber 39 from communicating with each other via the through hole 36. It should be noted that the through hole 36 is an example of an opening in the partition wall of the present invention, through which an output shaft passes.

In addition, a coupling portion 53 (refer to FIG. 1) of a dust box 70, which will be described later, is provided on the upstream side of the fan chamber 38 in the housing 31. The coupling portion 53 has a recessed shape in which the front side only is open, and a communicating hole 55 is formed in a second partition wall 54 forming the bottom of the coupling portion 53. The communication hole 55 is provided coaxially with the dust collecting fan 50 such that the coupling portion 53 is communicatively connected with the fan chamber 38.

As shown in FIG. 1 and FIG. 2, three plate-shaped male terminals 56, for a power source and for communication, are arranged in a row in the left-right direction at a predetermined interval on the rear surface of the upper portion of the housing 31 such that they protrude to the rear side. On the upper surface of the rear portion of the housing 31, a pressure rail 57 that engages with the guiding groove 24 provided in the mounting portion 22 of the hammer drill 1 is provided protrudingly in the front-rear direction of the housing 31. An inclined surface is formed on the rear end of the pressure rail 57, a height of the inclined surface becoming lower the further to the rear side. A pair of guide rails 58 are provided in a standing manner in the left-right direction on both the left and right sides of the pressure rail 57, at an interval allowing the lower portion of the mounting portion 22 to be engaged. On the upper edge of each of the guide rails 58, a protrusion 59 (refer to FIG. 2 and FIG. 3) is formed protrudingly toward the inner side, and the protrusion 59 can be engaged with a coupling groove (not shown in the drawings) formed in a side surface of the mounting portion 22.

As shown in FIG. 1, above the coupling portion 53 in the housing 31, a guide passage 60 is formed in the front-rear direction of the housing 31. The front side of the guide passage 60 is open and the rear side turns in a U shape and wraps around to the rear of the coupling portion 53. A nozzle 61 having an L shape in a side view is coupled to the front end of the guide passage 60, and a suction opening 62 provided on the leading end of the nozzle 61 protrudes upwardly from the housing 31. A flexible hose 63 is housed in the nozzle 61 and the guide passage 60 so as to extend through both the nozzle 61 and the guide passage 60. A duct 64 coupled to the rear end of the flexible hose 63 has a cylinder shape folded back in a U shape along the shape of the rear end of the guide passage 60. An exhaust outlet 65 opens on the rear end of the duct 64, and the exhaust outlet 65 penetrates the second partition wall 54 and protrudes into the coupling portion 53.

As shown in FIG. 2, the dust box 70 having a cuboid box body 71 and a lid 72 is detachably mounted on the coupling portion 53. The lid 72 is hinge jointed to an opening of the box body 71. An inlet 73 is formed on the side of one end of the lid 72 in the up-down direction, and an outlet 74 is formed on the side of the other end of the lid 72. Inside the dust box 70, a filter unit 75 is positioned such that it covers the outlet 74, and the filter unit 75 is mounted such that a filter surface 77 of a paper filter 76 protrudes. When the dust box 70 is mounted on the coupling portion 53, the rear end of the duct 64 is fitted into the inlet 73, the exhaust outlet 65 protrudes into the dust box 70, and the outlet 74 faces the communicating hole 55.

Next, an operation will be explained in which the dust collecting device 30 is mounted on the hammer drill 1 and dust arising from a workpiece is collected. When the dust collecting device 30 is mounted on the hammer drill 1, in a state in which the lower portion of the mounting portion 22 of the hammer drill 1 is aligned with the guide rails 58 of the housing 31 and the mounting portion 22 is positioned above the rear portion of the housing 31. Consequently, the dust collecting device 30 slides toward the rear such that the engagement recess portion 34 engages with the mounting portion 22 from the front. Then, the pressure rail 57 of the dust collecting device 30 is engaged with the guiding groove 24 of the mounting portion 22 and slides to the rear side. At this time, the protrusion 59 of each of the guide rails 58 is engaged with the coupling groove of the mounting portion 22 and slides to the rear side. Then, the pressure rail 57 comes into contact with the pressing piece 27, and the inclined surface of the pressure rail 57 pushes the pressing piece 27 in the upward direction. The connector 25 moves to the connected position in which the shutter portion 26 withdraws in the upward direction and the opening is positioned directly behind the socket 28. Then, the male terminals 56 of the dust collecting device 30 enter into the main housing 2 of the hammer drill 1 from the opened socket 28. Further, when the mounting portion 22 is engaged with the engagement recess portion 34 simultaneously, the male terminals 56 are inserted into the female terminals and are thus electrically connected.

When the switch 18 is switched on by pushing to operate a switch lever 19 of the hammer drill 1, the motor 4 is driven and rotates the countershaft 5. At that time, by a slide operation of the clutch 8 from the outside of the main housing 2, a position is selected from among a forward position in which the clutch 8 only engages with the first gear 7, a backward position in which the clutch 8 only engages with the boss sleeve 9, and an intermediate position in which the clutch 8 engages with the first gear 7 and the boss sleeve 9 simultaneously. By this selection, it is possible to select between three modes, which are a drill mode in which the tool holder 10 is rotated via the second gear 17 and rotates the bit 11, a hammer mode in which the piston cylinder 12 moves reciprocatingly by oscillation of the arm 13 and the interlocked striker 16 strikes the bit 11 via the impact bolt 14, and a hammer drill mode in which the rotation of the tool holder 10 and the striking of the bit 11 are performed simultaneously.

Further, when the switch 18 is switched on, the controller 23 supplies power to the controller 47 of the dust collecting device 30. As a result, the controller 47 conducts electricity to a commutator (not shown in the drawings) of a rotor, which rotates integrally with the output shaft 40 of the motor 41, through a brush (not shown in the drawings), and drives the output shaft 40 to rotate, thereby rotating the dust collecting fan 50. When the dust collecting fan 50 is rotated, outside air sucked in from the suction opening 62 of the nozzle 61 passes through the flexible hose 63 and the duct 64 and is discharged into the dust box 70 from the exhaust outlet 65. The air discharged into the dust box 70 passes to the front side of the filter unit 75 and passes from the filter surface 77 through the filter 76. The air passing through the filter 76 enters the fan chamber 38 from the outlet 74 via the communicating hole 55, and is discharged to the outside of the fan chamber 38 from an air discharge opening (not shown in the drawings) that causes the outside of the dust collecting device 30 to communicate with the fan chamber 38. Thus, the dust arising from the bit 11 from the drilling location of the workpiece is sucked up by the suction opening 62 along with the outside air and enters into the dust box 70, where the dust is trapped by the filter 76 and retained. It should be noted that the dust box 70 is an example of a dust collecting chamber of the present invention.

When the hammer drill 1 is operated, such as when the workpiece is drilled using the above-described bit 11, vibration is generated due to impact etc. because the bit 11 comes into contact with the workpiece. The vibration is continuously transmitted from the housing 31 of the dust collecting device 30 to the motor 41 via the respective protruding portions 42 and 43. If the rotor of the motor 41 is continuously whirled by the vibration, the commutator comes into sliding contact with the brush in this whirling state. As a result, wear of the brush is advanced. In order to prevent wear of the brush, in the present embodiment, the vibration is alleviated by the eight rubber pins 44 interposed between the respective protruding portions 42 and 43 and the outer peripheral surface of the motor cover 46. Accordingly, the vibration is prevented from being transmitted to the motor 41, and whirling of the rotor by the vibration is also suppressed. Therefore, wear of the brush that comes into sliding contact with the commutator is suppressed.

<Effects of Present Embodiment>

In the dust collecting device 30 of the present embodiment and the hammer drill 1 on which the dust collecting device 30 is mounted, even when the vibration caused during operation of the hammer drill 1 is transmitted to the housing 31 of the dust collecting device 30, the vibration transmitted to the motor 41 can be suppressed by the eight rubber pins 44. Consequently, the whirling of the rotor of the motor 41 is suppressed, and which inhibits the brush from coming into sliding contact with the commutator provided on the rotor. Thus, wear of the brush can be prevented, and which improves the life of the motor 41.

Further, for example, in comparison to a conventional case in which the cushioning member interposed between each of the protruding portions 42 and 43 and the outer peripheral surface of the motor cover 46 is provided in a cylindrical shape covering the outer peripheral surface of the motor cover 46, rubber to be used for the cushioning member can be reduced. Thus, a cost of the cushioning member can be reduced.

Furthermore, the seal member 52 is used to inhibit the fan chamber 38 and the motor chamber 39 from communicating with each other via the through hole 36 of the first partition wall 37. Therefore, even if the dust passing through the filter 76 without being trapped by the filter 76 reaches the fan chamber 38, it can be inhibited the dust from entering the motor chamber 39.

The present invention is not limited to the above-described embodiment, and part of the configuration can be changed as appropriate within the scope of and without departing from the spirit of the present invention. For example, in contrast to the above-described embodiment, the number of the rubber pins 44 is not limited to eight and an appropriate number (for example, four) of the rubber pins 44 may be interposed between the outer peripheral surface of the motor cover 46 and the columnar protruding portions 42 and 43 that protrude into the motor chamber 39. Further, in place of the rubber pins 44, for example, a cylindrical member made of rubber or sponge covering the outer peripheral surface of the motor cover 46 may be used as the cushioning member, and the cylindrical member may be interposed between the outer peripheral surface and the protruding portions 42 and 43.

Moreover, the seal member 52 that is fitted between the inner peripheral surface of the through hole 36 and the outer peripheral surface of the cylindrical portion 51 of the motor case 48 is not limited to the seal member made of rubber, and it may be made of synthetic resin or the like. In addition, in the above-described embodiment, an example is shown in which the dust collecting device 30 is mounted on the hammer drill 1. However, the present invention is not limited to this example, and the present invention may be applied to a power tool, such as a power drill, as long as the dust collecting device is mountable.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

The invention claimed is:

1. A power tool dust collecting device comprising:
    a housing in which a suction opening is protrudingly provided and on which a power tool is mountable;
    a motor chamber which is provided in the housing and which holds a motor having a brush that comes into sliding contact with a commutator of a rotor that rotates integrally with an output shaft;
    a fan chamber which is provided in the housing and which houses a dust collecting fan attached to the output shaft of the motor;
    a dust collecting chamber which is provided in the housing and in which a filter, through which passes air sucked up from the suction opening due to rotation of the dust collecting fan in accordance with driving of the motor and which collects dust in the air, is mounted on an upstream side of the fan chamber;
    a first pair of protruding portions protruding inwardly from a left inner wall of the motor chamber and protruding toward an outer peripheral surface of the motor from positions separated from each other in a transverse direction relative to a longitudinal axis of the motor;
    a second pair of protruding portions protruding inwardly from a right inner wall of the motor chamber and protruding toward the outer peripheral surface of the motor from positions separated from each other in the transverse direction, the first pair of protruding portions and the second pair of protruding portions facing one another from opposite sides of the motor and sandwiching the motor; and
    a plurality of cushioning members, each cushioning member being interposed between one of the protruding portions and the outer peripheral surface of the motor.

2. The power tool dust collecting device according to claim 1, wherein
    each of the plurality of cushioning members is a rubber pin, and
    the plurality of rubber pins are arranged in parallel with the output shaft at a predetermined interval along the outer peripheral surface.

3. The power tool dust collecting device according to claim 2, wherein the first pair of protruding portions and the second pair of protruding portions are disposed in two rows in a front-rear direction of the motor chamber.

4. The power tool dust collecting device according to claim 2, wherein
each protruding portion of the first pair of protruding portions and the second pair of protruding portions is formed in a columnar shape, and a transverse groove arranged in parallel with the output shaft is formed in a leading end portion of each of the protruding portions of the first pair of protruding portions and the second pair of protruding portions, and
each of the rubber pins is fitted into each of the transverse grooves.

5. The power tool dust collecting device according to claim 1, wherein
the housing is provided with a partition wall forming a partition between the motor chamber and the fan chamber and through which the output shaft passes, and a seal member inhibiting communication between the motor chamber and the fan chamber is provided on an opening which is formed in the partition wall and through which the output shaft passes.

6. The power tool dust collecting device according to claim 5, wherein
a cylindrical portion, through which the output shaft passes, is protrudingly provided on a leading end surface of a motor case holding the motor, and the cylindrical portion is inserted into the opening, and
the seal member is a ring-shaped rubber member fitted between an inner peripheral surface of the opening and an outer peripheral surface of the cylindrical portion.

7. A power tool on which is mounted the power tool dust collecting device according to claim 1.

8. A power tool dust collecting device comprising:
a housing in which a suction opening is protrudingly provided and on which a power tool is mountable, the housing including a left half housing and a right half housing assembled together;
a motor chamber which is provided in the housing and which holds a motor having a brush that comes into sliding contact with a commutator of a rotor that rotates integrally with an output shaft;
a fan chamber which is provided in the housing and which houses a dust collecting fan attached to the output shaft of the motor;
a dust collecting chamber which is provided in the housing and in which a filter, through which passes air sucked up from the suction opening due to rotation of the dust collecting fan in accordance with driving of the motor and which collects dust in the air, is mounted on an upstream side of the fan chamber;
a first pair of protruding portions protruding inwardly from an inner wall of the left half housing at the motor chamber and protruding toward an outer peripheral surface of the motor from positions separated from each other in a transverse direction relative to a longitudinal axis of the motor;
a second pair of protruding portions protruding inwardly from an inner wall of the right half housing at the motor chamber and protruding toward the outer peripheral surface of the motor from positions separated from each other in the transverse direction, the first pair of protruding portions and the second pair of protruding portions facing one another from opposite sides of the motor and sandwiching the motor; and
a cushioning member comprising rubber pins held by the first pair of protruding portions and the second pair of protruding portions facing one another, the rubber pins being arranged in parallel with the output shaft of the motor and being spaced apart at a predetermined interval along the outer peripheral surface of the motor.

* * * * *